US007768512B1

(12) United States Patent
Iourcha et al.

(10) Patent No.: US 7,768,512 B1
(45) Date of Patent: Aug. 3, 2010

(54) SYSTEM AND METHOD FOR RASTERIZING PRIMITIVES USING DIRECT INTERPOLATION

(75) Inventors: Konstantine I. Iourcha, San Jose, CA (US); Chung-Kuang Chin, Saratoga, CA (US); Zhou Hong, Cupertino, CA (US)

(73) Assignee: Via Technologies, Inc., Taipei (TW)

( * ) Notice: Subject to any disclaimer, the term of this patent is extended or adjusted under 35 U.S.C. 154(b) by 1444 days.

(21) Appl. No.: 09/371,972

(22) Filed: Aug. 10, 1999

Related U.S. Application Data

(60) Provisional application No. 60/095,995, filed on Aug. 10, 1998.

(51) Int. Cl.
*G06T 11/20* (2006.01)
*G09G 5/00* (2006.01)

(52) U.S. Cl. .................. 345/441; 345/581; 345/619
(58) Field of Classification Search ................ 345/606, 345/610, 607, 441, 619, 581
See application file for complete search history.

(56) References Cited

U.S. PATENT DOCUMENTS

| | | | | |
|---|---|---|---|---|
| 5,146,419 A | | 9/1992 | Miyoshi et al. ............ 364/748 |
| 5,282,156 A | | 1/1994 | Miyoshi et al. ............ 364/748 |
| 5,345,541 A | * | 9/1994 | Kelley et al. ............... 345/426 |
| 5,392,385 A | * | 2/1995 | Evangelisti et al. ......... 345/611 |
| 5,598,525 A | * | 1/1997 | Nally et al. ................. 345/546 |
| 5,627,773 A | | 5/1997 | Wolrich et al. ........ 364/715.03 |
| 5,706,415 A | * | 1/1998 | Kelley et al. ............... 345/426 |
| 5,739,818 A | * | 4/1998 | Spackman .................. 345/582 |
| 5,812,141 A | * | 9/1998 | Kamen et al. .............. 345/587 |
| 5,821,949 A | * | 10/1998 | Deering ..................... 345/505 |
| 6,108,007 A | * | 8/2000 | Shochet ..................... 345/586 |
| 6,111,584 A | * | 8/2000 | Murphy ..................... 345/430 |
| 6,115,050 A | * | 9/2000 | Landau et al. .............. 345/433 |
| 6,154,223 A | * | 11/2000 | Baldwin .................... 345/506 |
| 6,204,856 B1 | * | 3/2001 | Wood et al. ................ 345/608 |
| 6,239,809 B1 | * | 5/2001 | Morioka et al. ............ 345/422 |
| 6,271,848 B1 | * | 8/2001 | Yasui et al. ................ 345/419 |
| 6,275,234 B1 | * | 8/2001 | Iwaki ........................ 345/428 |

OTHER PUBLICATIONS

Foley et al., Computer Graphics Principles and Practice, Jul. 1997, Addison-Wesley Publishing Company, pp. 668-672 and 736-737.*

(Continued)

*Primary Examiner*—M Good Johnson
(74) *Attorney, Agent, or Firm*—Thomas, Kayden, Horstemeyer & Risley, LLP

(57) ABSTRACT

A system and method for rendering a graphic primitive by linear or perspective interpolation from vertex points. An interpolation engine is employed to interpolate channel values along edges of the primitive to determine values along a scan line containing a selected point. The interpolation engine is then employed to interpolate along the scan line. Processing time may further be reduced by the use of an improved adder/subtractor as a component of the interpolation engine to reduce sequential steps and improve parallelism.

6 Claims, 5 Drawing Sheets

OTHER PUBLICATIONS

Foley, James, D., et al., Computer Graphics: Principles and Practice (2$^{nd}$ ed. In. C), 1996 Addison-Wesley Publishing Company, Reading, Massachusetts, Jul. 1996.

Fuchs, Henry, et al., "Pixel-Planes 5: A Heterogeneous Multiprocessor Graphics System Using Processor-Enhanced Memories", Computer Graphics, vol. 23, No. 3, Jul. 1989, Chapel Hill, North Carolina.

Pineda, Juan, "A Parallel Algorithm for Polygon Raterization", Computer Graphics, vol. 22, No. 4, Aug. 1988, Chelmsford, Massachusetts.

Schilling, Andreas, "A New Simple and Efficient Antialiasing with Subpixel Masks", Computer Graphics, vol. 25, No. 4, Jul. 1991, Bundesrepublik, Deutschland.

Watt Alan, "Incremental Shading Techniques", 3D Computer Graphics (2$^{nd}$ edition), 1993, Addison-Wesley Publishing Company, Reading, Massachusetts, Sep. 1993.

Williams, Lance, "Pyramidal Parametrics", Computer Graphics, vol. 17, No. 3, Jul. 1983, Old Westbury, New York.

* cited by examiner

SYSTEM AND METHOD FOR RASTERIZING PRIMITIVES USING DIRECT INTERPOLATION

CROSS-REFERENCE TO RELATED APPLICATION

The subject matter of this application is related to the subject matter of co-pending U.S. patent application Ser. No. 09/020,152 filed on Feb. 6, 1998, by Konstantine Iourcha, Andrea Nguyen, and Daniel Hung, entitled "FAST ADDER/SUBTRACTOR FOR SIGNED FLOATING POINT NUMBERS", which is fully incorporated herein by reference. This application claims priority to U.S. Provisional Application Ser. No. 60/095,995 filed on Aug. 10, 1998, by Konstantine Iourcha et al., entitled "RATIO ENGINE FOR GRAPHIC INTERPOLATION", which is fully incorporated herein by reference.

BACKGROUND OF THE INVENTION

1. Field of the Invention

The present invention relates generally to rendering graphics system, and more particularly to texture mapping in graphics systems.

2. Description of Background Art

In many graphics applications, three-dimensional images are displayed on a computer screen by rendering a large number of graphic primitives, which are typically polygons (such as triangles). Primitives are defined using a number of parameters derived from three-dimensional object models, using transformation algorithms, projections, and light calculations. Initially, these parameters (or "channel values") are determined for each vertex of the primitive. For each vertex, these channel values include: a vertex location (X, Y); color values (such as R, G, B) or texture coordinates (U,V), depth of the vertex location (Z) blending parameter, such as an alpha value, and the like. Subsequently, the interior of each primitive is rasterized into a frame buffer using texture-mapping or other techniques for assigning color values to points within the primitives. Conventional techniques use some form of interpolation or incremental calculation to determine on a sequential basis the channel values of the points within the interior of each of the primitives that are rendered.

Many techniques are known for rendering graphic primitives in such graphics systems. For example, Foley et al., Computer Graphics: Principles and Practice, 2d. ed., 1990, describes methods for computing edges and for interpolating values for pixels within the primitives. Conventionally, primitive edges are determined from vertex points using line interpolation, and scan lines between the determined edges are filled with linearly or perspective interpolated values for color and other parameters.

Alternatively, techniques such as "Pixel-Planes" may be used to simultaneously determine linear or perspective functions for pixels within the frame buffer. Parallel linear expression evaluators comprising a binary tree of multiply-accumulator nodes are used to evaluate the expressions. See, for example, Fuchs et al., "Pixel-Planes 5: A Heterogeneous Multiprocessor Graphics System Using Processor-Enhanced Memories," in Computer Graphics, vol. 23, no. 3, July 1989. This technique has the advantage of improved parallelism, but requires expensive dedicated logic for each pixel.

Another technique, described in Pineda, "A Parallel Algorithm for Polygon Rasterization," in Computer Graphics, vol. 22, no. 4, August 1988, uses an edge function. An edge function is a linear function that subdivides a two-dimensional plane into three regions: points on the line, points to the "left" of the line, and points to the "right" of the line. Boolean combinations of edge functions are used to define primitives; for example, three edge functions can be combined to define a triangle primitive.

Once the edges are defined, traversal is employed to fill in the values for points within the primitive. Traversal is most often accomplished by sequentially scanning rows within the graphic primitive, and using linear interpolation to determine a value at each point on each row. See, for example, Foley et al., Computer Graphics: Principles and Practice, 2d. ed., 1990, pp. 870-71. Also, see Schilling, "A New Simple and Efficient Antialiasing with Subpixel Masks", in Computer Graphics, vol. 25, no. 4, July 1991, for antialiasing approach employing edge functions to determine distances from relevant edges.

In conventional scan conversion, processing is divided into two stages, namely a setup stage and a rasterization stage. The setup stage receives individual primitives that are defined by the relevant values at their vertices. The setup stage computes parameters that are needed for performing interpolation on an incremental or point-by-point basis. This computation can be an expensive process. In the rasterization stage, primitives are traversed to determine values at each individual pixel point.

Conventional graphics system thus encounter a tradeoff in computational load between the setup stage and the rasterization stage. The use of larger primitives shifts much of the load to the rasterization stage, as fewer primitives are used but each requires greater amounts of interpolation. Conversely, the use of smaller primitives reduces the amount of interpolation, but necessarily involves more computational load in the setup stage due to the increased number of primitives. Conventional graphics systems use distinct processor modules for the two stages, so that computational capacity cannot easily be shifted from one stage to the other. Therefore, such systems are often unable to efficiently process graphics when the number and size of primitives change. In other words, such conventional systems may be optimized for greater computational load in one or the other of the stages, but may not easily handle shifting loads as may occur in dynamic graphic images.

Another disadvantage of conventional systems is that the rasterization stage requires sequential traversal of scan lines within the primitives. In some applications, where a value for a given pixel location within a primitive may be needed, it may be inefficient to perform lengthy traversal operations of large portions of the primitive in order to determine the desired value.

What is needed is a system that combines the setup and rasterization stages in such a way that computational load can easily be shifted from one to the other without adversely affecting overall performance. What is further needed is a system for efficiently interpolating values within graphic primitives without extensive traversal of primitives, and also while avoiding the problems and inefficiencies of prior art schemes.

SUMMARY OF THE INVENTION

In accordance with the present invention, there is provided a system and method of interpolating values in graphic primitives without requiring separate hardware for the setup and rasterization stages. The present invention uses direct interpolation to generate a value for any point in a graphic primitive without necessarily traversing other portions of the primitive. Unified hardware is employed for the graphic rendering operations so that computational load can easily be shifted from one stage to the other. By combining the hardware required for the two stages, the present invention allows for more flexible resource distribution, and is therefore able to handle widely varying categories of images and graphic primitive dimensions.

In one embodiment in accordance with the invention, a system for rendering a graphic primitive is provided. The system includes a plurality of agents configured to receive information related to the plurality of vertices and generate output signals; an arbiter coupled to the plurality of agents and configured to receive the output signals and to generate request signals; an interpolation engine configured to receive the request signals and generate an output ratio signal dependent on at least some of the output signals from the plurality of agents; and a router coupled to the interpolation engine and configured to transmit the output ratio signal to an input of at least one of the plurality of agents.

An interpolation engine is used to interpolate the value of a channel at any point on the primitive edge or selected scan line although the practice of the present invention is not intended to be limited to a particular interpolation engine such as that described below.

The method of the present invention is generalized so that any desired value at a given point can be derived from known values at vertices. Thus the known vertices can be described in terms of their channel values, such as coordinates (for example, X, Y, U, V, Z, or any combination thereof) or parameters (for example, color values), or some combination thereof. Given the values of some known parameters at some position, such as a point intersecting a line that connects two vertices, the method of the present invention will determine, using direct (i.e., non-incremental) perspective or linear interpolation, values for unknown parameters at that position. This technique provides several advantages. Relatively low setup overhead is incurred, since vertices of primitives can be used directly, without additional complex setup computations. This results in higher primitive throughput. For example, a method of rendering a graphic primitive in accordance with an embodiment of the invention includes, deriving a channel value of a first point on a first edge of the primitive; deriving a channel value of a second point on a second edge of the primitive; and based upon the channel values of the first point and the second point, determining a channel value for an interior point located within an interior surrounded by the edges of the primitive.

In addition, this technique facilitates computation on an as-needed basis, so that any required computations for other portions of the primitive may be deferred until needed. Pixels may be generated in any convenient order, without the sequential limitations of incremental methods. The resulting flexibility increases efficiency for implementations of more advanced features or techniques. Such methods employ techniques for reordering pixel drawing, and therefore are more effective when computation may be performed on an as-needed or random-access basis. Other visible-surface algorithms can benefit from the present invention. See, for example, Foley et al. at pp. 672-95.

The described technique also avoids several problems associated with edge function processing. The present invention avoids needless calculation of areas that are not being drawn. Also, since the technique performs interpolation across horizontal scan lines, sequential horizontal traversal can be made extremely efficient. In essence, the present technique facilitates processing for points on a random-access basis, but is also capable of providing improved efficiency when sequential traversal is used.

An additional advantage is avoidance of the problem of allocating resources between setup and rasterizing. All of the processing can be handled by a single component, so that its utilization and through-put are maximized. Whether processing an image with a relatively large number of small primitives, or a small number of large primitives, resources are allocated in an efficient manner. Shifts in processing load between "setup" and "rendering" are of little consequence since all functional components may reside in the same piece of hardware.

Finally, the present invention provides smoother gradations of precision as coordinate ranges increase. This is useful for processing unclipped primitives. Since direct floating point computation may be employed, overflow is rare, and accuracy can be easily controlled. Original vertices can be used for interpolation, even when only a small portion of the primitive (possibly not even including the vertices) is being drawn.

DETAILED DESCRIPTION OF THE INVENTION

Figure 1:
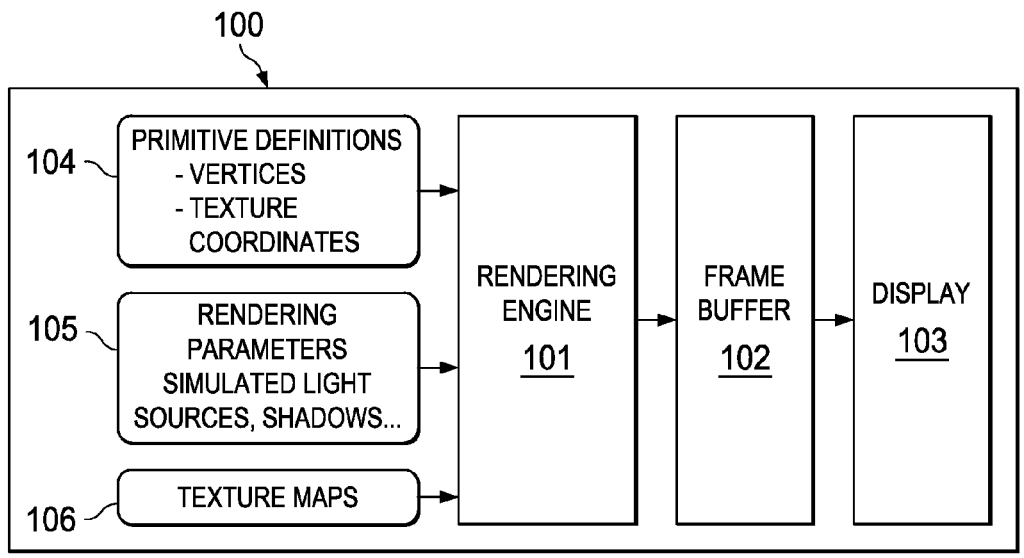
FIG. 1 is a block diagram of a graphics system for practicing the present invention.

Referring now to FIG. 1, there is shown a block diagram of a graphics system for practicing the present invention. System 100 is typically implemented on a computer system such as a personal computer having an Intel Pentium™ processor and running the Windows™ 95 operating system from Microsoft Corporation. However, those of ordinary skill in the art will realize that the practice or implementation of the present invention is not limited to the system disclosed in FIG. 1. Rendering engine 101 contains software and hardware for rendering primitives into frame buffer 102. Frame buffer 102 is typically implemented in an area of random-access memory (RAM) that may be optimized for video data storage. Individual memory locations in frame buffer 102 correspond to defined points on display 103. Data from frame buffer 102 is sent to display 103 for output to the user. Display 103 is typically a cathode-ray tube, but may be based on some other form of display technology.

Rendering engine 101 takes input from primitive definitions 104, rendering parameters 105, and texture maps 106 when rendering primitives. Primitive definitions 104 typically include data describing the size, shape, position, and other relevant characteristics of graphic primitives. In most systems, primitives are polygons such as triangles, so that primitive definitions 104 may include coordinates of the polygon vertices, as well as other information, such as texture coordinates, for each of these vertices. Primitives may be defined in three dimensions using Euclidian coordinates or in four dimensions using homogeneous coordinates, and projected onto a two-dimensional plane by a known algorithm. In this case, rendering engine 101 or a separate module (not shown) may contain the logic for performing the appropriate transformations involved in accomplishing the projection.

Rendering parameters 105 may include any number of variables and parameters that affect the rendering operation. Simulated light sources, shadows, and other effects may be generated by altering the operation of rendering engine 101 in a selected manner.

Texture maps 106 may be used to apply a texture to a primitive being rendered by engine 101. Texture maps 106 are typically two-dimensional graphic representations of image that is projected onto the primitive to give the illusion that the primitive forms part of a physical surface.

The present invention typically operates in the context of rendering engine 101, though in other embodiments the invention may be applied to other components of graphics systems. For illustrative purposes, the description given below refers to application of the invention to a graphics system 100 as shown in FIG. 1.

As discussed above, primitive definitions 104 typically include the channel values associated with the vertices of the primitives. The generalized form of the interpolation problem is to determine the channel value of a point (such as a pixel) located within a primitive, given the relevant channel values at the vertices of the primitive. The channel value for a point P within a primitive (FIG. 2A) may include but is not limited to any or all of the following channel values (or attributes) of the pixel at point P: pixel location (X, Y), color or texture coordinates (U, V), and depth (Z) value. One known technique for performing this conversion is known as rasterization. As described in Foley et al. at page 871, various incremental techniques of varying complexity can be used to perform the interpolation. These techniques typically involve scanning the primitive on a line-by-line basis, and applying incremental addition to each successive pixel in order to derive a pixel value. Considerable processing time and setup are required to perform these operations, and random access to any given point in the primitive is not easily accomplished without traversing the primitive up to that point.

Figure 2A:
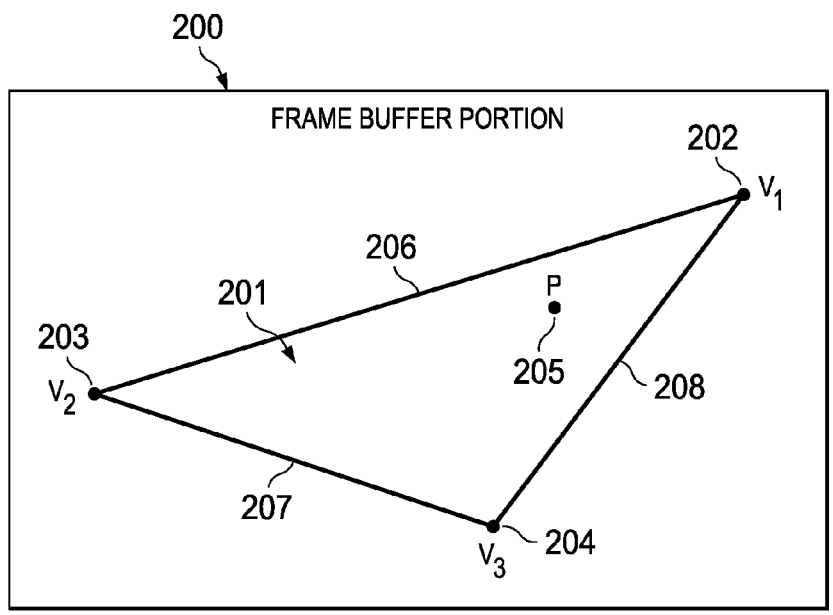
FIG. 2A is a diagram of a primitive to be rendered using the present invention.
Figure 2B:
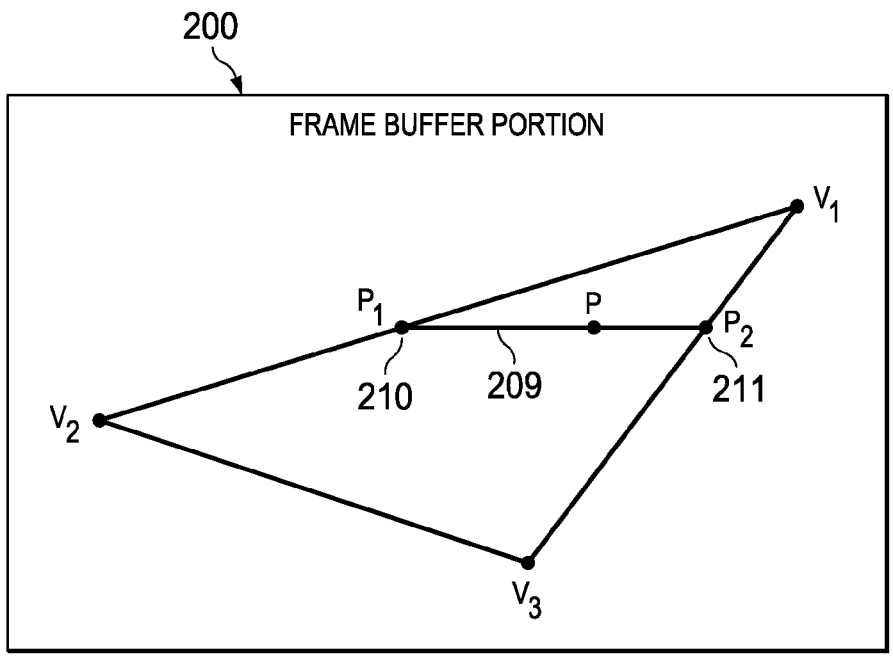
FIG. 2B is a diagram of a primitive to be rendered, showing construction of line segments for interpolation used in the present invention.
Figure 2C:
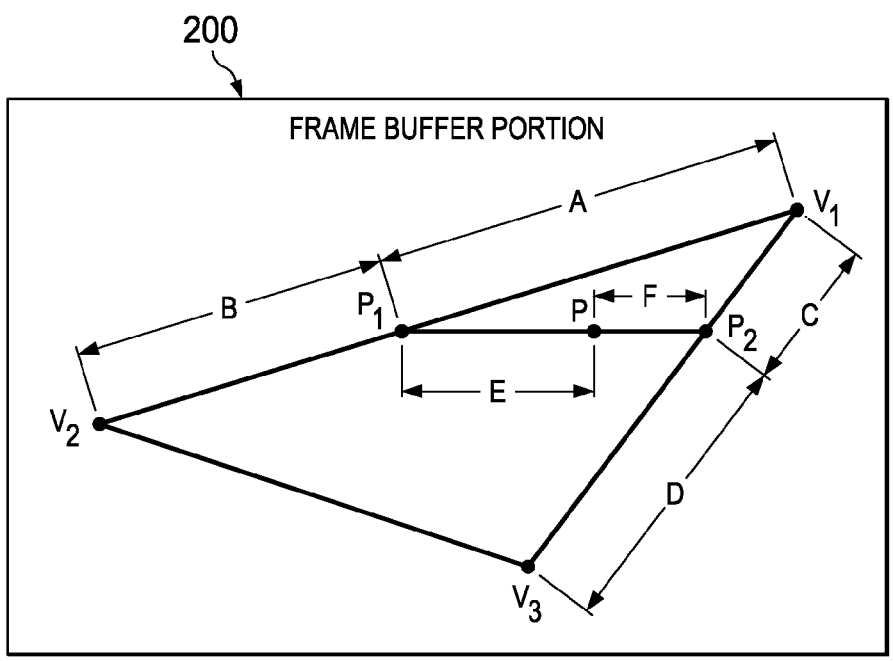
FIG. 2C is a diagram of a primitive to be rendered, showing additional line segments used for interpolation by the present invention.

Referring now to FIGS. 2A through 2C, there is shown a series of conceptual diagrams illustrating the general principles of the present invention. FIG. 2A shows a portion 200 of frame buffer 102 containing a primitive 201. For illustrative purposes, only one primitive 201 is shown. Primitive 201 is a triangle, though any shape may be used. Primitive 201 is defined by its three vertices 202, 203, 204, labeled $V_1$, $V_2$, and $V_3$, respectively. Accordingly, three sides 206, 207, 208 are defined, which form the edges of primitive 201. Point 205, designated as P, is selected as the point (or pixel) to be rendered.

In order to determine a channel (or pixel) value for point P from the relevant channel values at vertices $V_1$, $V_2$, and $V_3$, the present invention performs direct interpolation as follows. Referring now to FIG. 2B, there is shown the same primitive 201 in frame buffer portion 200. A line segment 209 has been added, defined as a horizontal line segment that intersects point P. In alternative embodiments, the line segment may have an orientation other than horizontal; however the horizontal line segment as shown is advantageous since it facilitates sequential traversal along scan lines. Additional points 210 and 211, designated as $P_1$ and $P_2$, respectively, are defined as the points of intersection of line segment 209 with any two sides of primitive 201.

Referring now to FIG. 2C, there is shown the same primitive 201 in frame buffer portion 200. Various distances between points are indicated and labeled, as follows:

A: distance between $V_1$ and $P_1$;
B: distance between $V_2$ and $P_1$;
C: distance between $V_1$ and $P_2$;
D: distance between $V_3$ and $P_2$;
E: distance between P and $P_1$; and
F: distance between P and $P_2$.

Derivation of a pixel value for point P is done by three interpolation operations. First, a value for point $P_1$ is derived by interpolation between the values for points $V_1$ and $V_2$, as shown in Equation 1 below. Point $P_1$ is a point that intersects a primitive edge that is bounded by points $V_1$ and $V_2$. The interpolation operation (for linear interpolation) is described by the formula:

$$\text{channel value}(P_1) = (B * \text{channel value of } (V_1) + A * \text{channel value of } (V_2))/(A+B) \quad \text{(Eq. 1)}$$

Equation 1 describes an interpolation approach that defines a channel value of a point along an edge of a primitive as a ratio of the point's distance from each of the vertices that define the ends of the primitive edge. Thus, if the channel value sought for $P_1$ is its coordinate location, the ratio of P1's distance from $V_1$ and $V_2$, respectively, is calculated and then used as P1's coordinate location. As described more fully below, in one embodiment an interpolation system is employed to perform this calculation. However, it is understood from the teachings of the present invention that these calculations may be performed other suitable systems.

Similarly, a channel value for point $P_2$ is derived by interpolation between the values for points $V_1$ and $V_3$, as follows:

$$\text{channel value}(P_2) = D * \text{channel value}(V_1) + C * \text{channel value}(V_3))/(C+D) \quad \text{(Eq. 2)}$$

Once values for $P_1$ and $P_2$ have been determined, a third interpolation between the two is performed in order to derive a value for point P:

$$\text{channel value}(P) = (F * \text{channel value}(P_1) + E * \text{channel value}(P_2))/(E+F) \quad \text{(Eq. 3)}$$

It can be seen that for successive points on the same horizontal span, only the third interpolation need be performed. Thus, the present invention offers added efficiency when sequential traversal along horizontal scan lines is used. Although this is advantageous, it is not a required feature of the present invention, and in alternative embodiments, points $P_1$ and $P_2$ need not lie on the same horizontal line segment.

Figure 2D:
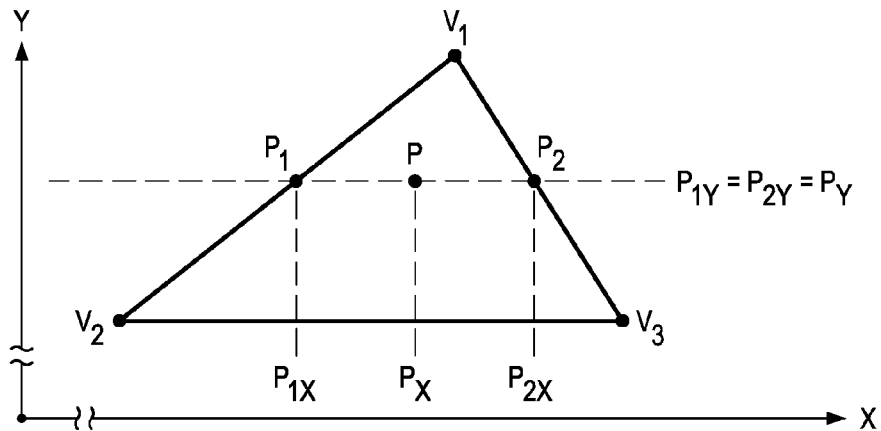
FIG. 2D is a diagram of a primitive with a point P to be interpolated within the primitive.

Reference is now made to FIG. 2D to further show an example of performing direct linear interpolation in accordance with an embodiment of the present invention. Each of the vertices $V_1$, $V_2$, and $V_3$ will have channel values in the coordinates (X, Y, U, V, Z). The channel values for each vertex is as follows: vertex $V_1 = (X, Y, U, V, Z) = (V_{1X}, V_{1Y}, V_{1U}, V_{1V})$, vertex $V_2 = (V_{2X}, V_{2Y}, V_{2U}, V_{2V})$, vertex $V_3 = (V_{3X}, V_{3Y}, V_{3U}, V_{3V})$.

(Each of the vertices may also include a channel value Z although this is not intended to be limiting in any way. The channel value Z is not required when performing the method of direct linear interpolation but is required when performing the method of direct perspective interpolation. As shown further below, the method of direct perspective interpolation uses the channel value Z as a perspective correction coordinate.)

The Y coordinate for a particular point $P_1$ will be determined by the API or equivalent programming interface. For example, point $P_1$ may have a Y coordinate of $P_{1Y}=2$. The channel values of point $P_1$ are as follows in this example. Point $P_1=(X,Y,U,V)=(P_{1X}, P_{1Y}, P_{1U}, P_{1V})$. A linear ratio $R_{P1Y}$ may be calculated based on the following: $R_{P1Y}=(V_{1Y}-P_{1Y})/(V_{1Y}-V_{2Y})$. The X coordinate $P_{1X}$ of point $P_1$ is then calculated based on the following: $P_{1X}=R_{P1Y}*V_{2X}+(1-R_{P1Y})*V_{1X}$. The U coordinate $P_{1U}$ of point $P_1$ may be calculated based on the following. $P_{1U}=R_{P1Y}*V_{2U}+(1-R_{P1Y})*V_{1U}$. The V coordinate $P_{1V}$ of point $P_1$ may be calculated based on the following. $P_{1V}=R_{P1Y}*V_{2V}+(1-R_{P1Y})*V_{1V}$.

The channel values of point $P_2$ are as follows in the above example. Point $P_2=(X,Y,U,V)=(P_{2X}, P_{2Y}, P_{2U}, P_{2V})$. A linear ratio $R_{P2Y}$ may be calculated based on the following: $R_{P2Y}=(V_{1Y}-P_{2Y})/(V_{1Y}-V_{3Y})$. The X coordinate $P_{2X}$ of point $P_2$ is then calculated based on the following: $P_{2X}=R_{P2Y}*V_{3X}+(1-R_{P2Y})*V_{1X}$. The U coordinate $P_{2U}$ of point $P_2$ may be calculated based on the following. $P_{2U}=R_{P2Y}*V_{3U}+(1-R_{P2Y})*V_{1U}$. The V coordinate $P_{2V}$ of point $P_2$ may be calculated based on the following. $P_{2V}=R_{P2Y}*V_{3V}+(1-R_{P1Y})*V_{1V}$.

The channel coordinates of point P is represented as $(X, Y, U, V)=(P_X, P_Y, P_U, P_V)$. In the example above, the Y coordinate of point P is $P_Y=2$. The U,V coordinates of point P can be then determined as follows. A linear ratio $R_{PX}$ is determined based on the following: $R_{PX}=(P_{2X}-P_X)/(P_{2X}-P_{1X})$. The X coordinate $P_X$ of point P is calculated as follows: $P_X=R_{PX}*P_{2X}+(1-R_{PX})*(P_{1X})$. In the alternative, X coordinate $P_X$ may be provided by the API or equivalent programming interface. The U,V coordinates $P_U, P_V$ of point P are calculated as follows: $P_U=R_{PX}*P_{1U}+(1-R_{PX})*(P_{2U})$, and $P_V=R_{PX}*P_{1V}+(1-R_{PX})*(P_{2V})$.

In an alternative embodiment, the API may provide a constant X coordinate value. For example, for point $P_1$, $P_{1X}=2$. As a result, a ratio $R_{1X}$ may be calculated based on the following: $R_{1X}=(V_{1X}-P_{1X})/(V_{1X}-V_{2X})$. The Y, U, V coordinates of point $P_1$ are calculated based on the following equations: $P_{1Y}=R_{1X}*V_{2Y}+(1-R_{1X})*V_{1Y}$, $P_{1U}=R_{1X}*V_{2U}+(1-R_{1X})*V_{1U}$, and $P_{1V}=R_{1X}*V_{2V}+(1-R_{1X})*V_{1V}$. Similarly, the coordinates $P_{2Y}, P_{2U}$, and $P_{2V}$ for point $P_2$ may be calculated based on the approach similarly described above. The coordinates $P_Y, P_U$ and $P_V$ of point P are then calculated based on an approach as similarly described above.

In an alternative embodiment, perspective interpolation is performed in lieu of linear interpolation. To perform perspective interpolation, the system considers primitive 201 to have a three-dimensional position, so that a depth coordinate is available in addition to the conventional two-dimensional X and Y coordinates. Distances A through F are weighted by a perspective correction parameter. In accordance with a preferred embodiment of the present invention, the perspective correction parameter used is the channel value Z although this approach is not intended to be limiting in any way. The inverse form of the depth correction variable W may also be used. In one embodiment, the system of the present invention can be set to one of two modes, for linear and perspective interpolation respectively.

Figure 6:
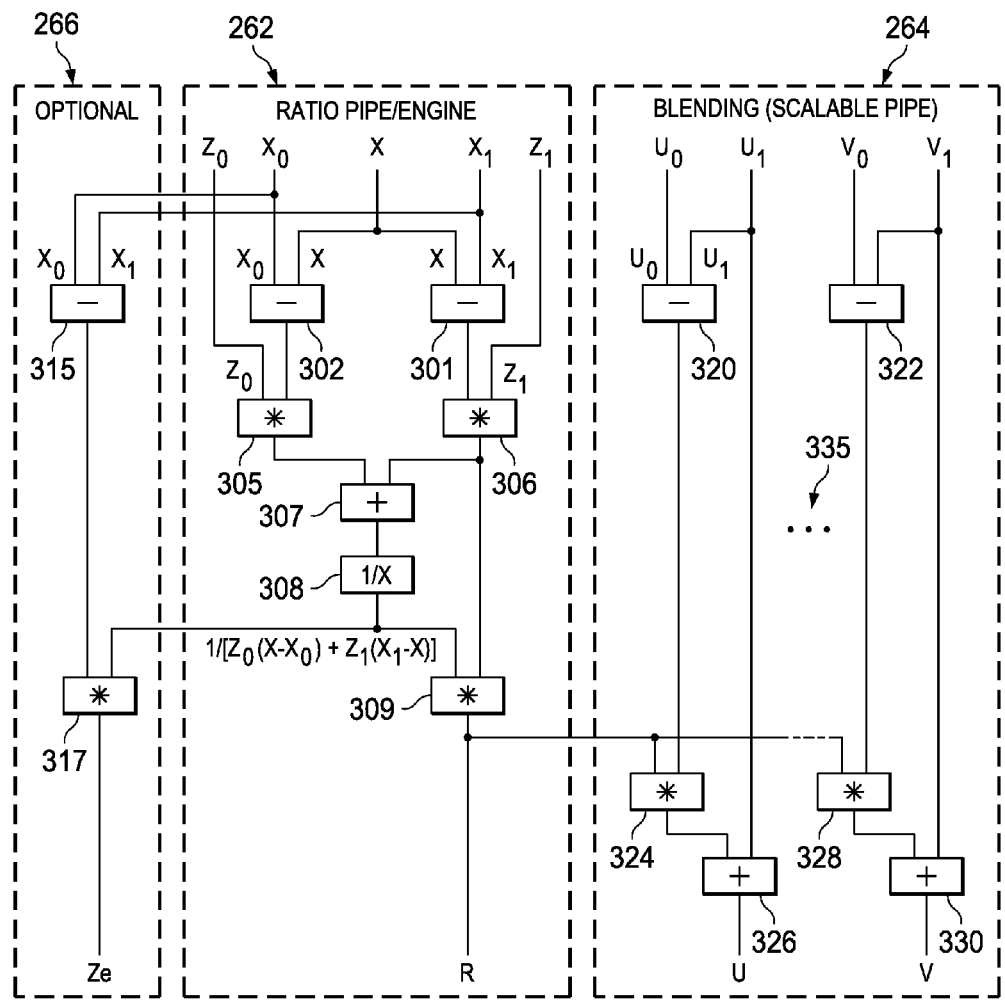
FIG. 6 is a schematic diagram showing additional details of an interpolation engine according to the present invention.

In one embodiment, two pipes operate in parallel: a ratio pipe and blending pipe. In an alternative embodiment, a third pipe 266 may be optionally implemented as shown in FIG. 6. The ratio pipe takes as its inputs values for the following variables which are also shown in FIG. 6:

X: value of an independent variable, such as physical position, at the point being processed;

$X_0, X_1$: endpoint (vertex) values for the independent variable;

$Z_0, Z_1$: endpoint (vertex) values for depth (perpendicular to the projection plane);

$U_0, U_1$: endpoint (vertex) values for a dependent variable, such as color or texture coordinates, to be interpolated;

$V_0, V_1$: endpoint (vertex) values for a dependent variable, such as color or texture coordinates, to be interpolated;

In the implementation described below, parameter blenders for color and alpha channels (R, G, B, A) are implemented outside the engine in a pixel processor (not shown) in a conventional manner. Input Z-values are assumed to be positive, and the interpolation is always done within the line segment. Degenerative line segments (where both end points are the same), are permissible.

In one embodiment, main pipe input is provided in the form of the following signals, which may be in an integer or floating point format:

| Variable | Description | Format |
| --- | --- | --- |
| R_X_0 | input variable 0, might be any of X, Y, U, V, Z | 1.8.15 = 24, float |
| R_X_1 | input variable 1, might be any of X, Y, U, V, Z | 1.8.15 = 24, float |
| R_Z_0 | input (weight) variable 0, usually Z | 1.8.15 = 24, float |
| R_Z_1 | input (weight) variable 1, usually Z | 1.8.15 = 24, float |
| R_X | requested value of the variable to interpolate to | 1.8.15 = 24, float |
| R_U_0 | input variable 0, might be any of X, Y, U, V, Z | 1.8.15 = 24, float |
| R_U_1 | Input variable 1, might be any of X, Y, U, V, Z | 1.8.15 = 24, float |
| R_V_0 | input variable 0, might be any of X, Y, U, V, Z | 1.8.15 = 24, float |
| R_V_1 | input variable 0, might be any of X, Y, U, V, Z | 1.8.15 = 24, float |

In one embodiment, the interpolation engine generates the following signals as output:

| Interpolation Engine Output | | |
| --- | --- | --- |
| Variable | Description | Format |
| R_U | Output variable, might be any of X, Y, U, V, Z | 1.8.15 = 24 or float |
| R_V | Output variable, might be any of X, Y, U, V, Z | 1.8.15 = 24 or float |
| R_R | Output ratio | 8 unsigned |

The interpolation engine performs computations as follows. Note that the prefix "R_" is omitted in the variables in the calculations below.

Interpolation calculations are performed as follows:

```
IF (X_1-X_0 !=0) {
U=(X_1-X)((U_0-U_1)/(X_1-X_0))+U_1
V=(X_1-X)((V_0-V_1)/(X_1-X_0))+V_1
}
ELSE {
U=U_1
V=V_1
}
```

It is noted, however, that if $X_1-X_0=0$, other values may also be set for U and V. The use of IF/THEN conditions in the interpolation calculations immediately above describes one embodiment for contending with variable instability, such as when a divide-by-zero conditions occurs when computing a ratio, and is not intended to limit the present invention in any way. A divide-by-zero condition is commonly referred to as a "DEGEN" or degenerate case.

Figure 2E:
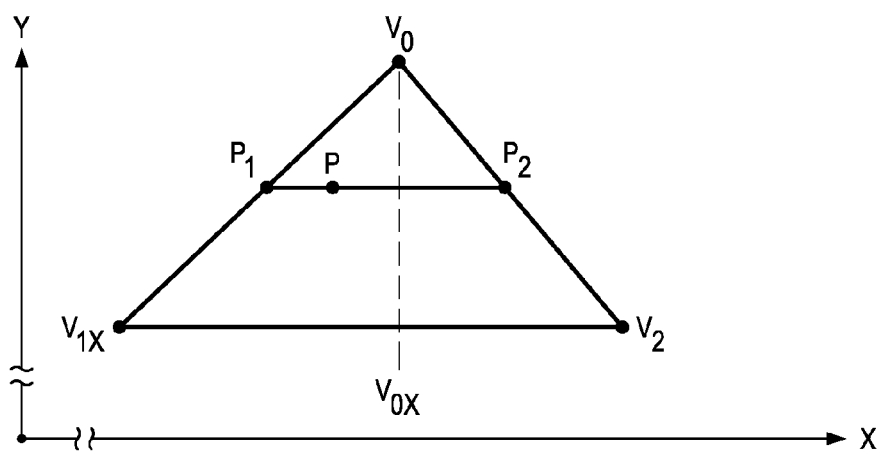
FIG. 2E illustrates a non-degenerative condition for a primitive.

FIG. 2E illustrates a non-DEGEN or non-degenerative case. For example, in the non-DEGEN case, the X coordinates of vertex $V_1$ and $V_0$ are not equal (i.e., $V_{0X}$–$V_{1X}$ does not equal zero (0)). The U,V channel values are then calculated using the approaches mentioned above.

Figure 2F:
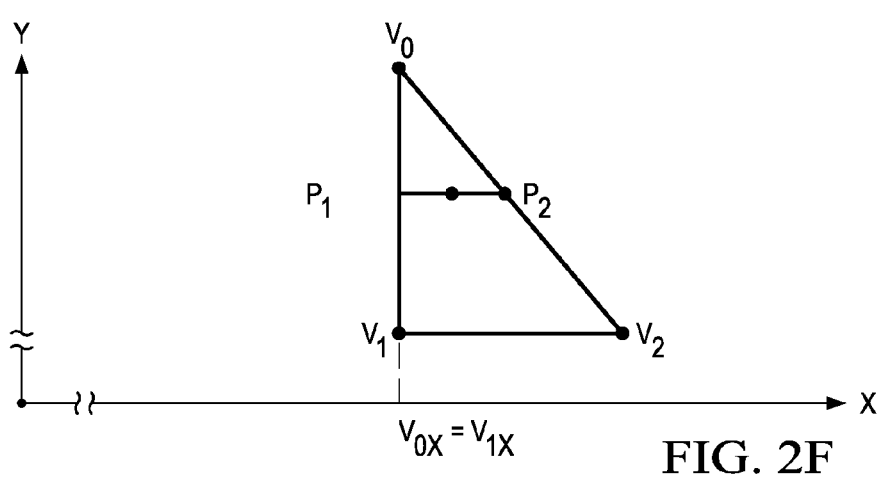
FIG. 2F illustrates a degenerative condition for a primitive.

FIG. 2F illustrates a DEGEN case in which $V_{0X}$=$V_{1X}$. Hence, when computing the ratio values described above, a divide-by-zero condition is present. Thus, in the "else" command in the interpolation calculations immediately above sets U=U1 (i.e., $P_{1U}$=$V_{1X}$). As another alternative, the "else" command can set the following condition in a DEGEN case: $P_{1U}$=$V_{0X}$.

Calculations for the perspective ratio for use in perspective interpolation are as follows:

IF $((((X_1-X)Z_0)(X_0-X)Z_1))$ !=0)
PR=$((X_1-X)Z_0)/(((X_1-X)Z_0)-((X_0-X)Z_1))$
ELSE
PR=0
where $Z_0 Z_1$ !=1.

The perspective ratio, PR, may then by used in lieu of a linear ratio to interpolate a corresponding channel value. For example, referring again to 2D, the U coordinate for point P is interpolated using the following equation: $P_u$=PR $(P_{1u})$+(1–PR)$(P_{2u})$. Similarly, the V coordinate for point P is interpolated using the following equation: $P_v$=PR$(P_{1v})$+(1–PR)$(P_{2v})$.

Figure 3:
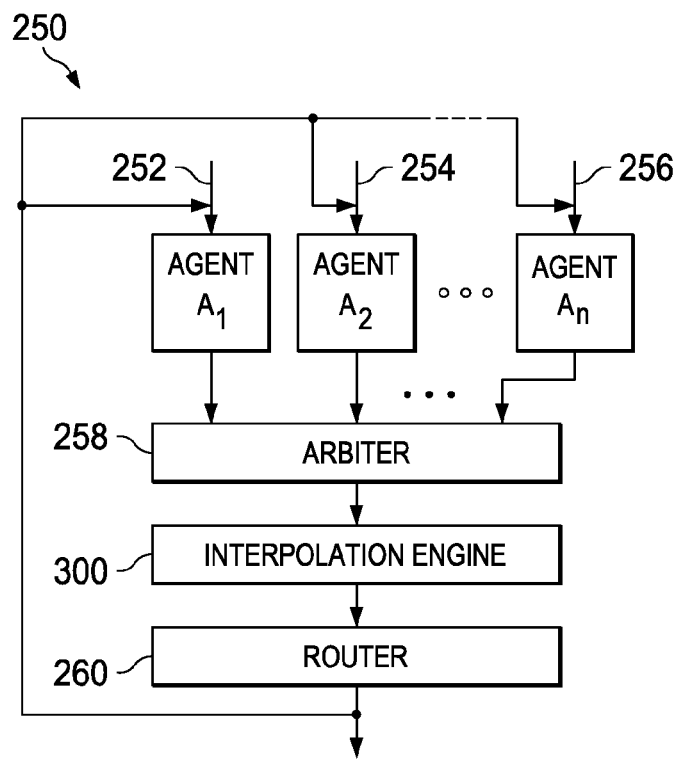
FIG. 3 is a general block diagram of an interpolation system according to the present invention.
Figure 4:
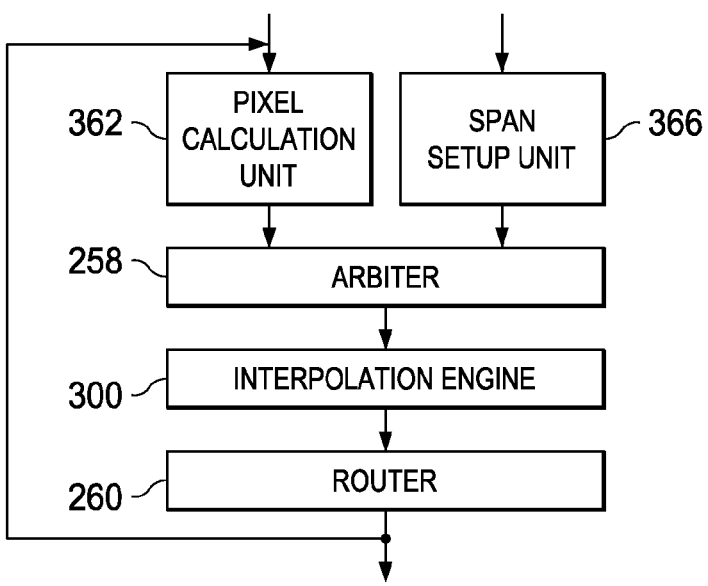
FIG. 4 is a specific block diagram of an interpolation system according to the present invention.

FIG. 3 is a block diagram of an interpolation system that includes an interpolation engine 300 in accordance with an embodiment of the present invention. A plurality of agents $A_1, A_2, \ldots A_n$ receives signals 252, 254 and 256, respectively. The signals received by the agents are signals from the API and may include information about each vertices of a primitive and independent variable X (or Y) from the API. In one embodiment, the agents $A_1, A_2, \ldots A_n$ may be implemented by pixel calculation unit 362 and span setup unit 366, as shown in FIG. 4. The pixel calculation unit 362 receives, for example, the X coordinates $P_{1X}$ and $P_{2X}$ of points $P_1$ and $P_2$, respectively, on primitive edges (FIG. 2D). For each $P_{1X}$ and $P_{2X}$ pair, the pixel calculation unit 362 generates a request to interpolation engine 300 to calculate a $P_X$ value for a point P within the primitive edges. The span setup unit 366 receives vertex channel information for a primitive and a value of an independent variable such as X or Y. The API provides the independent variable value. For each independent variable, the span setup unit 366 generates a request to interpolation engine 300 to calculate X coordinates $P_{1X}$ and $P_{2X}$ of points on primitive edges.

Figure 5:
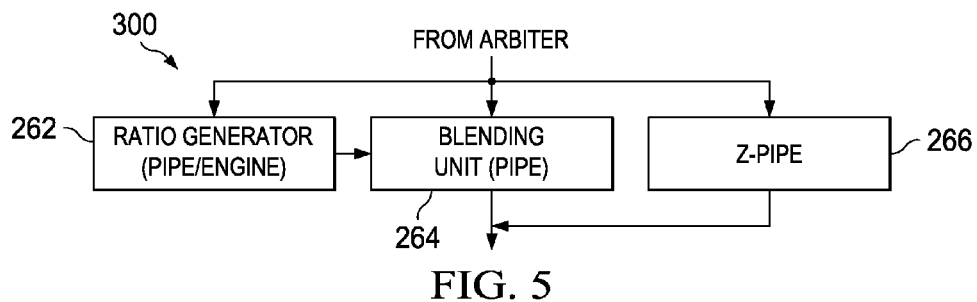
FIG. 5 is a block diagram of an interpolation engine according to the present invention.

It is further noted that the agents $A_1, A_2, \ldots A_n$ are scalable. An arbiter 258 receives the outputs of agents $A_1, A_2, \ldots A_n$ and implements a conventional arbitration algorithm. The arbiter 258 requests the interpolation engine to interpolate color or texture coordinates U,V and calculate ratio values (e.g., any of ratio values A' to F' above). The output of the arbiter 258 is received by the interpolation engine 300 which rasterizes primitives by use of direct interpolation in accordance with the present invention. The output of router 260 may feedback into the inputs of agents $A_1, A_2, A_n$ for purposes of rasterizing other points as needed in the primitive. In particular, the ratio values calculated by interpolation engine 300 may be routed by router 260 to the agents $A_1, A_2, \ldots A_n$ for use during the rasterization other points in the primitive. FIG. 5 is a block diagram of an interpolation engine 300 in accordance with an embodiment of the present invention. The interpolation engine 300 includes a ratio generator 262, a blending unit 264, and a Z-pipe 266. The output of the ratio generator 262 serves as an input signal for the blending unit 264. The blending unit 264 outputs interpolated values for U and V, while the Z-pipe 266 outputs interpolated values for Z. The details and functionality of the ratio generator 262, blending unit 264, and Z-pipe 266 are discussed further below.

Referring now to FIG. 6, there is shown an example of one possible implementation of an interpolation engine 300 for use in the present invention. Field lengths and other descriptive elements are exemplary only, and other values may be used in lieu of those shown. From the inputs described above, and using the logic described in the above code, interpolation engine 300 generates interpolated values for U, V, and Ze. Ze represents a screen-based Z-coordinate, which may be equivalent to an inverted eye-z value. The ratio pipe or engine 262 generates a ratio value R which is also received by the blending pipe 264.

Values for U, V, R and Ze are determined as follows. In one embodiment, the ratio pipe 262 includes subtractors 301 and 302 that are used to determine the differences between $X_1$ and X, and $X_0$ and X, respectively. As stated above, X is an independent variable value such as the physical position at the point to be processed. Perspective correction is applied to differences by multiplying the output of subtractor 302 by $Z_0$ and the output of subtractor 301 by $Z_1$, using multipliers 305 and 306 respectively. $Z_0$ is the Z-coordinate at $X_0$, while $Z_1$ is the Z-coordinate at $X_1$.

An adder 307 adds the outputs of multipliers 305 and 306, and a module 308 inverts the output of adder 307 to generate the term $1/[Z_0(X-X_0)+Z_1(X_1-X)]$. A multiplier 309 then multiplies the outputs of module 308 and multiplier 306 to generate the ratio R=$Z_1(X_1-X)/[Z_0(X-X_0)+Z_1(X_1-X)]$.

In one embodiment, the Z pipe 266 includes a subtractor 315 that determines the difference between $X_1$ and $X_0$. A multiplier 317 multiplies the output of subtractors 315 and module 308 to generate Ze=$(X_1-X_0)[Z_0(X_0-X_0)+Z_1(X_1-X)]$. The Ze value is a perspective depth coordinate that represents the inverse value 1/w wherein w is the above mentioned perspective coordinate parameter. It is noted that the Z pipe 266 is an optional element in the block diagram of FIG. 6.

In one embodiment, the blending pipe 264 includes subtractors 320 and 322 that are used to determine the differences between $U_0$ and $U_1$, and $V_1$ and $V_0$, respectively. A multiplier 324 multiples the outputs of subtractor 320 and multiplier 309 to generate the output R($U_0$–$U_1$). An adder 326 adds the output of multiplier 324 with $U_1$ to generate U=R($U_0$–$U_1$)+ $U_1$=R $U_0$+(1–R) $U_1$.

A multiplier 328 multiplies the output of subtractor 322 with R to generate R($V_0$–$V_1$). An adder 330 adds the output of multiplier 328 with $V_1$ to generate V=$V_1$+R($V_0$–$V_1$)=R $V_0$+ (1–R) $V_1$.

The elements in the blending pipe 264 may be scalable, as represented by dot symbols 335. In addition, based on the teachings of the present invention, one of ordinary skill in the art will realize the mathematical functions provided by the blending pipe 264 may be varied. As a result, the elements of blending pipe 264 (e.g., multiplier 324 and 328 and adders 326 and 330) may be connected in other configurations to achieve other desired mathematical functions for the blending pipe 264.

The interpolated output values U,V for perspective interpolation are listed and described further below.

$$U=U_1+[Z_1(X_1-X)](U_0-U_1)/[(X_1-X)Z_1+(X-X_0)Z_0] \quad \text{(Eq. 4)}$$

$$V=V_1+[Z_1(X_1-X)](V_0-V_1)/[(X_1-X)Z_1+(X-X_0)Z_0] \quad \text{(Eq. 5)}$$

The term $(X-X_0) Z_0$ is of a small value and is a term that prevents, for example, the ratio $Z_0(X_1-X)/[(X_1-X) Z_1+(X-$ $X_0) Z_0]$ from having a unity value. The perspective coordinate parameters $Z_1$ and $Z_0$ are applied to the terms in equations 4 and 5 above to the interpolated values for U,V.

As stated above, the blending pipe 264 if FIG. 6 is scalable. Hence subtractor stages may be added to calculate, for example differences in X coordinates $(X_0-X_1)$ and/or differences in Y coordinates $(Y_0-Y_1)$. Alternatively, multiplexer stage may be implemented in the interpolation engine 300 of FIG. 6 so that inputs can be selected among the values such as $U_0, U_1, V_0, V_1, X_0, X_1, Y_0, Y_1$ or differences between these values (e.g., $X_0-X_1$). It is also noted that if multiplier stage 305 and 306 are omitted, then a linear interpolation function may be performed by the interpolation engine. Alternatively, a linear interpolation function may be performed by suitably blocking the $Z_0$ and $Z_1$ inputs.

Subtractors 301, 302, 303, 310, 319, 320, and 321, and adders 333, 334, 335 can be implemented as conventional floating-point, integer or other subtractors, as specified. Subtractors are known by those of ordinary skill in the art, and the type of subtractor chosen is not intended to be limiting. Alternatively, one embodiment of the present invention employs an improved subtractor as disclosed in related application Ser. No. 09/020,152 for "Fast Adder/Subtractor for Signed Floating Point Numbers", by Konstantine Iourcha, Andrea Nguyen, and Daniel Hung, filed Feb. 6, 1998, the disclosure of which is incorporated herein by reference.

It is within the scope of the present invention to implement a program or code that can be stored in an electronically-readable medium to permit a computer to perform the methods described above.

From the above description, it will be apparent that the invention disclosed herein provides a novel and advantageous system and method of graphic interpolation for rendering primitives. The foregoing discussion discloses and describes merely exemplary methods and embodiments of the present to invention. As will be understood by those familiar with the art, the invention may be embodied in other specific forms without departing from the spirit or essential characteristics thereof. In particular, other component types may be employed, and other primitive types, dimensions, or projections may be used. Accordingly, the disclosure of the present invention and example figures are intended to be illustrative, but not limiting, of the scope of the invention, which is set forth in the following claims.

What is claimed is:

1. A method for rendering a graphic primitive in a graphics system, the graphic primitive having a plurality of sides that define the edge of the primitive, the method comprising:

receiving, in the graphics system, a signal from an interface, the signal comprising data about a plurality of vertices of the graphic primitive;

selecting, in the graphics system, an interior point within the graphic primitive;

identifying, in the graphics system, a first side point on a first one of the sides and a second side point on a second one of the sides, the first side point and the second side point being points of intersection with the edge of the graphic primitive of a line segment intersecting the interior point, the first side point and the second side point each having a shared first channel value in common with the interior point;

calculating, in the graphics system, a first ratio for the first side point according to the shared first channel value and a first channel value of each of the vertices of the first one of the sides;

determining, in the graphics system, a plurality of remaining channel values for the first side point based on the first ratio;

calculating, in the graphics system, a second ratio for the second side point according to the shared first channel value and a first channel value of each of the vertices of the second one of the sides;

determining, in the graphics system, a plurality of remaining channel values for the second side point based on the second ratio;

storing, in the graphics system, the plurality of channel values determined for the first side point and the second side point; and determining, in the graphics system, a plurality of remaining channel values for each of a plurality of interior points intersected by the line segment and each having the shared first channel value, each of the remaining channel values for a respective one of the interior points being determined according to a corresponding stored channel value of the first side point and a corresponding stored channel value of the second side point.

2. The method of claim 1, wherein determining, in the graphics system, a plurality of remaining channel values for the first side point and determining, in the graphics system, a plurality of remaining channel values for the second side point further comprises performing, in the graphics system, linear interpolation using an interpolation engine to determine the remaining channel values for the first side point and the second side point.

3. The method of claim 1, wherein determining, in the graphics system, a plurality of remaining channel values for the first side point and determining, in the graphics system, a plurality of remaining channel values for the second side point further comprises performing, in the graphics system, perspective interpolation using an interpolation engine to determine the remaining channel values for the first side point and the second side point.

4. The method of claim 1, wherein the channel value represents color.

5. The method of claim 1, wherein the channel value represents luminance.

6. The method of claim 1, wherein the channel value represents a texture coordinate.

* * * * *